United States Patent [19]

Rothenberg et al.

[11] Patent Number: 4,507,662

[45] Date of Patent: Mar. 26, 1985

[54] OPTICALLY COUPLED, ARRAY ANTENNA

[75] Inventors: Carl Rothenberg, North Bellmore; John J. Stangel, Mahopac; Pasquale A. Valentino, Glen Head, all of N.Y.

[73] Assignee: Sperry Corporation, New York, N.Y.

[21] Appl. No.: 321,142

[22] Filed: Nov. 13, 1981

[51] Int. Cl.[3] ........................ H01Q 3/26; H01Q 19/06; H04B 7/00

[52] U.S. Cl. ...................................... 343/376; 343/754

[58] Field of Search ............... 343/754, 854, 376, 368, 343/371, 372, 375

[56] References Cited

U.S. PATENT DOCUMENTS

| | | | |
|---|---|---|---|
| 3,245,081 | 4/1966 | McFarland | 343/754 |
| 3,631,503 | 5/1969 | Tang et al. | 343/754 |
| 3,755,815 | 3/1973 | Stangel et al. | 343/754 |
| 3,835,469 | 9/1974 | Chen et al. | 343/754 |
| 4,185,286 | 1/1980 | Drabowitch et al. | 343/754 |
| 4,246,585 | 1/1981 | Mailloux | 343/854 |
| 4,268,831 | 5/1981 | Valentino et al. | 343/754 |

FOREIGN PATENT DOCUMENTS

| | | | |
|---|---|---|---|
| 12551 | 1/1979 | Japan | 343/754 |

*Primary Examiner*—Eli Lieberman

*Assistant Examiner*—Michael C. Wimer

*Attorney, Agent, or Firm*—Howard P. Terry; Seymour Levine

[57] ABSTRACT

A scannable antenna having a radiating array of antenna elements correspondingly coupled, through equal line lengths, to a more closely spaced array of antenna elements positioned in a space coupling region. A feed array of antenna elements, with spacings substantially equal to the spacing in the radiating array and substantially of the same physical size as the more closely spaced array, is positioned in the space coupling region in close proximity, no more than a wave length away, to the more closely spaced array. The feed array is coupled to a distribution network which provides desired phase and amplitude aperture distributions.

13 Claims, 2 Drawing Figures

OPTICALLY COUPLED, ARRAY ANTENNA

BACKGROUND OF THE INVENTION

1. Field of the Invention

The invention relates to the field of electronically steerable antennas and more particularly to electronically steerable antennas with optically coupled feed systems.

2. Description of the Prior Art

Conventional electronically scanned antennas are seldomly proposed for high gain, limited scan applications because they require an excessive number of control elements and phase shifters. To reduce the number of control elements and phase shifters, considerable attention has been devoted to limited scan antenna techniques. Conventional designs with narrowed field view produce only a limited savings on the number of phase shifters over wide angle antenna systems, because the maximum element spacings are constrained to avoid the formation of grating lobes. Several early efforts for achieving a limited scan capability with significant control elements and phase shifter reductions utilized a small electronically steerable array located in a focal region of a microwave optical system. These systems, however, exhibit low aperture efficiency, since only a portion of the aperture is illuminated for each scan angle.

Significant improvements in aperture efficiency and antenna component reductions were realized with the development of the overlapping subarray technique. This technique uses appropriate combinations of orthogonal beam formers and switching networks to achieve the desired scanning capability and beam characteristics. In these designs, the primary collimating device is a lens or reflector with subarraying networks, such as, Butler matrices or Rotman lenses located in the focal regions. Limited scan antennas of this type exhibit the unfavorable characteristics of a physically deep configuration which is associated with optically fed array systems.

Several alternatives have been proposed to the lens fed, sub-arraying systems. These alternatives fall into two general categories. The first, a conceptually straight forward extension of the lens fed system, simply substitutes a Butler matrix for the primary collimating lens. Because of the complexity of the Butler matrix this is not an attractive approach for large aperture antennas. The second uses partially overlapped or interlaced arrays. A variety of specific design approaches have been suggested which offer significant reduction in antenna depth. These designs, however, exhibit poor side lobe and loss performance with reduced scanning capabilities relative to the fully overlapped sub-arrays.

The present invention overcomes the physical drawbacks of the optically fed limited scan techniques while substantially achieving performance characteristics of fully overlapped sub-arrays.

SUMMARY OF THE INVENTION

A preferred optically coupled array antenna constructed according to the principles of the present invention includes a linear array of N elements with a preselected interelement spacing $s_1$ therebetween. A second array of N elements, compressed in that its interelement spacing $s_2$ is significantly less than the interelement spacing of the first array, is correspondingly coupled to the first array via transmission lines of equal length. A third array of M elements, with interelement spacing $s_3$ is positioned in an energy coupling relationship with the second array and separated therefrom by a distance which may be substantially equal to the wave length of the operating frequency. The elements of the third array are fed through phase shifters by a conventional power distribution network to create the desired illumination function. When the second and third arrays are substantially of equal length, the compressed spacing of the second array $s_2$ provides an element ratio for the third to first arrays of M/N given by $s_2/s_3$, that is significantly less than unity, thus the number of phase shifters required is appreciably less than the number of radiating elements. Providing second and third arrays of substantially equal length establishes total phase variation across these arrays that are substantially equal. The compressed spacing of the second array, however, establishes a phase gradient that is reduced by a factor M/N times the ratio of the element spacings of the third and first arrays $s_3/s_1$ from the phase gradient of the third array providing a concomitant reduction in the electronic scan coverage which is consistent with fundamental electronic scanning principles.

DESCRIPTION OF THE PREFERRED EMBODIMENT

Figure 1:
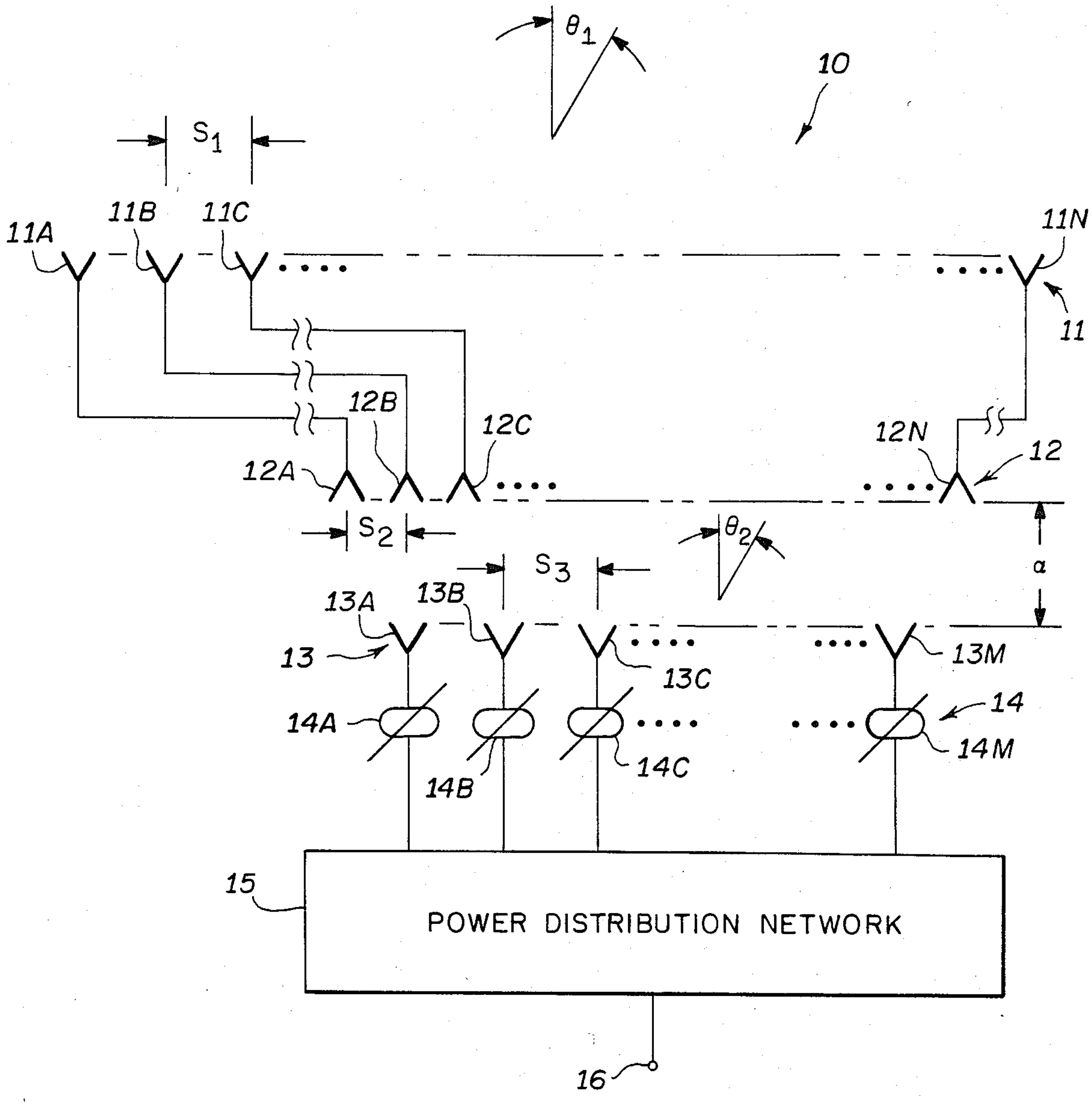
FIG. 1 is a schematic diagram of an antenna embodying the principles of the invention.

An optically coupled array antenna as schematically shown in FIG. 1 is a reciprocal device and may perform as a receiving and a transmitting antenna. For clarity and brevity of presentation only the operation of a transmitting antenna will be described. This description will provide a complete recitation of the basic principles of the invention. These principles will be recognized by those skilled in the art as equally applicable to receiving antenna operation.

The linear array is illustrative and is presented for ease of explanation. It should be recognized that the description to follow is equally applicable to planar and conformal arrays for two dimensional scan systems.

Referring to FIG. 1 there is shown an optically coupled array antenna 10 including a linear array 11 with N elements. These elements 11A through 11N have uniform interelement spacing $s_1$ typically in the range between the operating frequency wave length $\lambda$ and $\lambda/2$ to supress grating lobes. Elements 11A through 11N are correspondingly coupled, via equal line lengths, to elements 12A through 12N of a second equally spaced array 12 with interelement spacings $s_2$ that is less than $s_1$. A third array 13 with interelement spacing $s_3$ is positioned a distance a from the array 12 which may be in the order of an operating wave length of the antenna. Each element 13A through 13M of the array 13 is correspondingly coupled, by phase shifters 14A through 14M, to a power distribution network 15, which distributes power coupled to an input port 16 thereof to each of the elements of the array 13 in accordance with the predetermined aperture distribution function.

With phase shifters 14A through 14M set to provide a uniform phase progression across the aperture of the array 13, an interelement phase gradient $\Delta\phi_3=\beta s_3$ sin $\theta_2$ is established across the array, where $\beta$ is the phase constant in the coupling region. This gradient causes a wave at an angle $\theta_2$ to propagate in the space between array 13 and array 12. Since the spacing between array 12 and array 13 may be in the order of a wave length, this wave causes an interelement phase gradient across the array 12 of $\beta s_2 \sin \theta_2$. The interelement phase gradient so established is coupled to the aperture of array 11, wherein for the interelement spacings of the elements 11A through 11N and the free space phase constant k, must be equal to $ks_1 \sin \theta_1$; thus, $$\beta s_2 \sin \theta_2 = ks_1 \sin \theta_1$$

$$\sin \theta_1 = \frac{\beta s_2}{ks_1} \sin \theta_2$$

Consequently, in sine space coordinates the scan angle in free space is modified by the ratio of the tangential interelement phase gradients of the array 12 and the array 11.

When the interelement spacings $s_1$ and $s_3$ of arrays 11 and 13 are substantially equal, the phase constants $\beta$ and k are substantially equal, and the lengths of the arrays 12 and 13 are substantially equal, the relationship between $\sin \theta_1$ and $\sin \theta_2$ reduces to $$\sin \theta_1 = \frac{M}{N} \sin \theta_2$$

Because the spacing $s_2$ is less than the spacing $s_3$ there are fewer elements in the array 13 than in the array 12, thus M is less than N. Hence, the number of phase shifters 14A through 14M is less than the number of radiating elements 11A through 11N. This reduction in the number of required phase shifters is accompanied by a corresponding reduction in scan angle coverage by a factor M/N in sine space, which is consistent with fundamental electronic scanning principles. It should be apparent to those skilled in the art that this scan angle reduction may be mitigated, to some extent, by providing a phase constant $\beta$ in the region between array 12 and array 13 that is greater than the free space phase constant k.

When the interelement spacings $s_1$ and $s_3$ of the first and third arrays are not equal, the ratio of the phase gradient $$\frac{\Delta\phi_1}{\Delta\phi_3} = \frac{M}{N} \frac{s_2}{s_1}$$

providing a modification to the phase gradient reduction M/N by the factor $s_2/s_1$.

Figure 2:
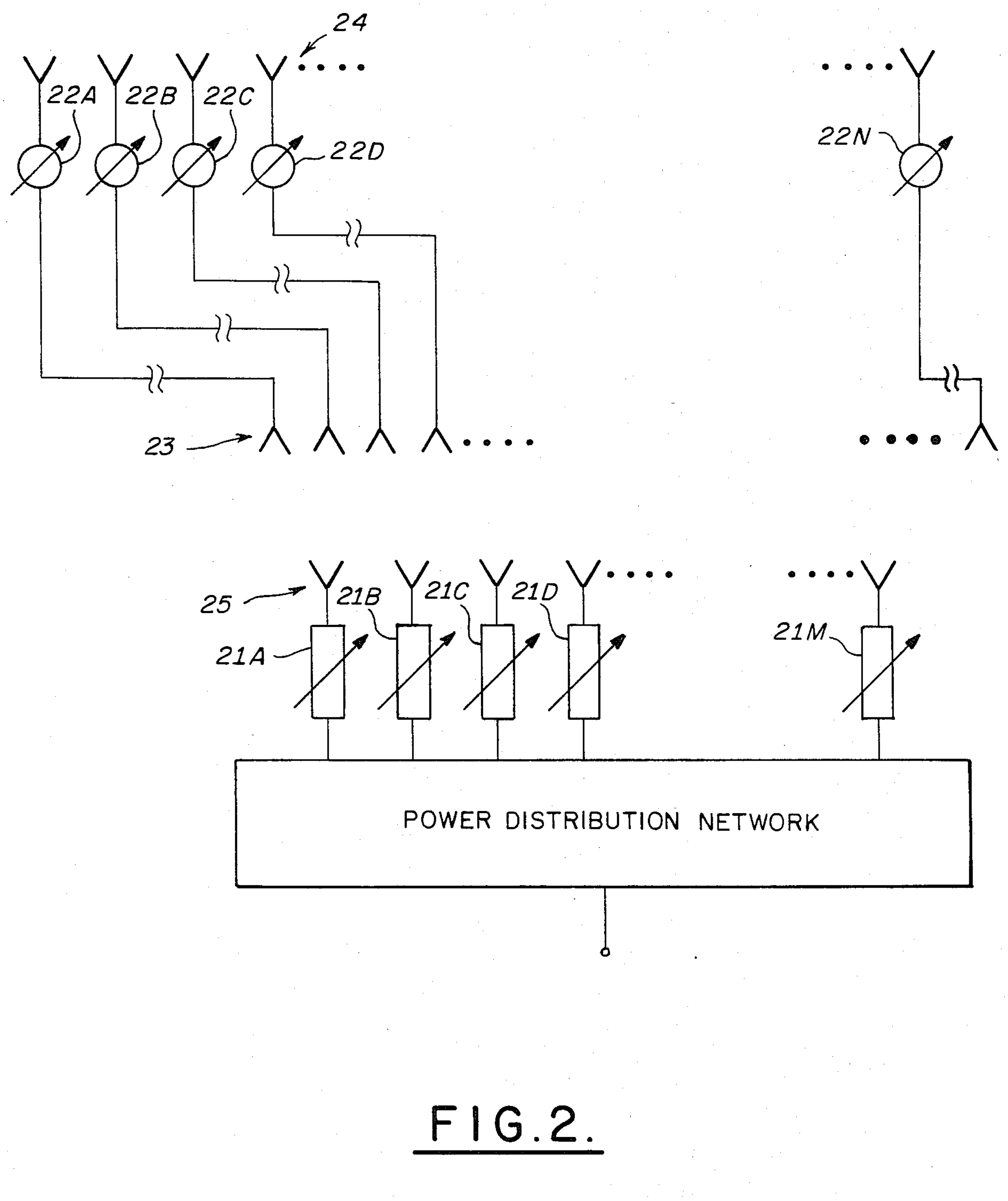
FIG. 2 is a schematic diagram of a broad signal bandwidth antenna embodying the principles of the invention.

Those skilled in the art will recognize that the performance of an antenna utilizing the principles of this invention may be determined with an analysis similar to that employed for the fully overlapping sub-array antennas discussed previously. Exciting each individual element of array 13 will produce substantially identical excitations of array 11 (except for edge effects) in segments translated along the length of array 11 by integer multiples of $Ns_1/M$. These excitations produce substantially identical patterns in the far field, and the composite far field pattern of the antenna system is produced by phasing these subarray patterns in the manner described above. The overlapping subarray concept may be utilized with this invention to realize relatively broad signal bandwidth operation. Such a configuration having step-scan fine-scan capability is shown in FIG. 2. Step-scan phase shifters 21A through 21M may be electronically controlled real time phase shifters, as for example delay lines, may be coupled between the power distribution network 26 and the elements of array 25, while fine-scan phase shifters 22A through 22N may be coupled between the elements of arrays 23 and 24. Radiation from the elements of the array 25 cause the array 24 to be illuminated substantially in segments. Since the signal bandwidth capability of an antenna is inversely proportional to the transit time across the antenna, the signal bandwidth of the system with real time phase shifters is determined by the length of the individual subarrays rather than the effective length of the array 24 as with the system of FIG. 1, thus creating a net bandwidth increase of M.

While the invention has been described in its preferred embodiments, it is to be understood that the words that have been used are words of description rather than of limitation and that changes within the purview of the appended claims may be made without departing from the true scope and spirit of the invention in its broader aspects.

We claim:

1. A scannable antenna comprising:

a first antenna array having elements with spacings $s_1$ therebetween in an energy exchanging relationship with free space;

a space coupling region;

a second antenna array having N elements with spacings $s_2$ therebetween in an energy coupling relationship with said space coupling region and correspondingly coupled to said elements of said first antenna array, said $s_2$ spacing being less than said $s_1$ spacing;

a third antenna array having M elements with spacings $s_3$ therebetween in an energy coupling relationship with said space coupling region, said $s_3$ spacing being greater than said $s_2$ spacing and N being greater than M; and means coupled to said third antenna array for establishing a preselected phase and amplitude distribution across said elements of said third array.

2. A scannable antenna in accordance with claim 1 wherein said distribution means includes;

means having at least one port for exchanging signals with external components and a plurality of element ports for establishing preselected amplitude distributions across said element ports; and means coupled between said plurality of element ports and said third array of antenna elements for establishing preselected phase distributions whereby said phase and amplitude distributions are established across said third array of antenna elements.

3. A scannable antenna in accordance with claim 2 wherein said phase distribution means comprises real time phase shifters.

4. A scannable antenna in accordance with claim 3 further including means correspondingly coupled between said elements of said first array and said elements of said second array for providing fine-scan phase shifts to said elements of said first array.

5. A scannable antenna in accordance with claim 1 wherein said spacing $s_3$ is equal to said spacing $s_1$.

6. A scannable antenna in accordance with claim 3 wherein signal phase constants in said space coupling region exceed signal phase constants in free space.

7. A scannable antenna in accordance with claim 5 wherein said distribution means comprises;

means having at least one port for exchanging signals with external components and a plurality of element ports for establishing preselected amplitude distributions across said element ports; and means coupled between said plurality of element ports and said third array of antenna elements for establishing preselected phase distributions whereby said phase and amplitude distributions are established across said third array of antenna elements.

8. A scannable antenna in accordance with claim 7 wherein said phase distribution means includes real time phase shifters.

9. A scannable antenna in accordance with claim 8 further including means correspondingly coupled between said elements of said first array and said elements of said second array for providing fine scan phase shifts to said elements of said first array.

10. A scannable antenna in accordance with claim 1 wherein said third antenna array is spaced from said second antenna array a distance substantially equal to a wavelength of an operating signal of said scannable antenna.

11. A scannable antenna in accordance with claim 10 wherein said distribution means comprises;

means having at least one port for exchanging signals with external components and a plurality of element ports for establishing preselected amplitude distributions across said element ports; and means coupled betwen said plurality of element ports and said third array of antenna elements for establishing preselected phase distributions whereby said phase and amplitude distributions are established across said third array of antenna elements.

12. A scannable antenna in accordance with claim 11 wherein said phase distribution means includes real time phase shifters.

13. A scannable antenna in accordance with claim 12 further including means correspondingly coupled between said elements of said first array and said elements of said second array for providing fine scan phase shifts to said elements of said first array.

* * * * *